Jan. 3, 1961     C. C. DAY     2,967,289
CONNECTOR MEANS
Filed June 29, 1959
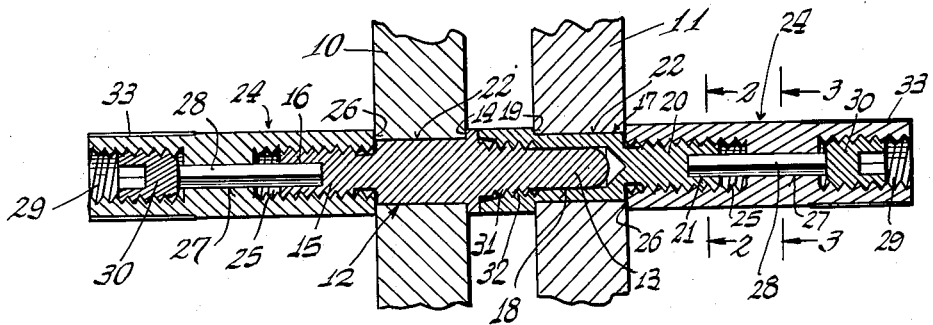
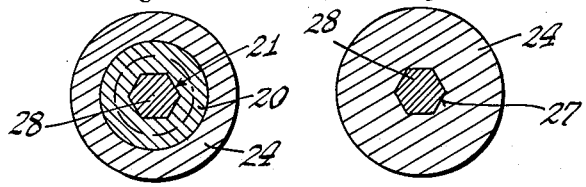 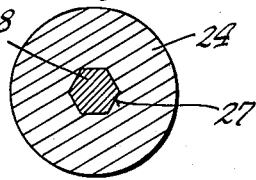
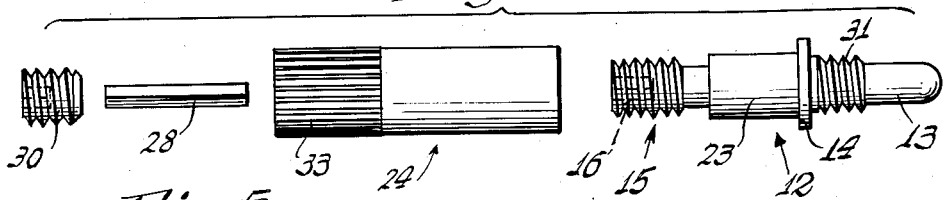
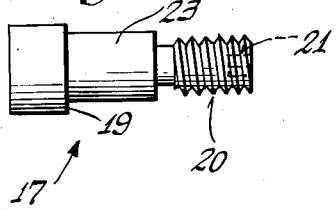 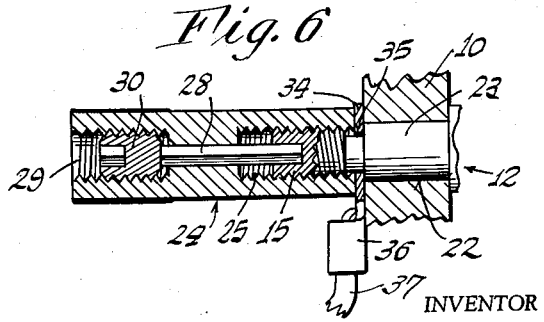
INVENTOR
Chauncey Castle Day
BY Johnson and Kline
ATTORNEYS 2,967,289
Patented Jan. 3, 1961

2,967,289

CONNECTOR MEANS

Chauncey Castle Day, 69 Greenacre Ave.,
Longmeadow 6, Mass.

Filed June 29, 1959, Ser. No. 823,428

8 Claims. (Cl. 339—268)

The invention relates to a novel connector structure for securing together two members.

It is an object of the present invention to provide a simple, yet efficient connector member for connecting together two members, such as plates or the like, which can be readily assembled and operated to hold the plates in predetermined position.

A feature of the invention resides in the simplicity of the structure whereby the connectors can be made relatively inexpensive and can be assembled in position with a minimum of effort.

Another feature of the invention is the novel means for locking together the unit and its clamping nut to prevent inadvertent relative rotation therebetween.

If desired, the unit can be readily adapted to form an electrical connection with the plate or with other means, if insulated from the plate, with the mere addition of a connector lug.

Other features and advantages of the invention will be apparent from the specification and claims when considered in connection with the accompanying drawings in which:

Figure 1 is a longitudinal sectional view.

Fig. 2 is a transverse sectional view taken along line 2—2 of Fig. 1.

Fig. 3 is a transverse sectional view taken along line 3—3 of Fig. 1.

Fig. 4 is an exploded view of the male unit and nut assembly.

Fig. 5 is a side elevation of the female unit.

Fig. 6 is a fragmentary longitudinal sectional view of the device with an electrical connection thereto.

As shown in the drawings, the device of the present invention comprises a connector means connecting two members or plates 10 and 11 or the like members together. The connector comprises a male unit 12, as shown in Figs. 1 and 4, having a pin 13 projecting at one end thereof, a rearwardly facing shoulder 14 intermediate the ends thereof, and a threaded stud 15 projecting from the other end of said unit and having an axial recess 16 of out-of-round, preferably polygonal, cross section therein. The connector includes a female unit 17, as shown in Figs. 1 and 5, having a pin-receiving socket 18 at one end to receive the pin 13 of the male connector, a rearwardly facing shoulder 19 intermediate the ends of the unit and a threaded stud 20 projecting from the other end of the unit and provided with a similar axial recess 21 of out-of-round, preferably polygonal, cross section.

The two units are adapted to be inserted in apertures 22 in the plates as shown in Fig. 1. While the portion 23 of each unit passing through the aperture may be of an out-of-round cross section where it is desired to prevent relative rotation between the unit and the plate, in the herein illustrated form of the invention the unit portion extending through the aperture is of cylindrical cross section to permit the unit to be rotated therein when connecting the male and female members. The units are each locked in position in the plates by threaded means. While the means may take many forms, it is herein illustrated as a nut 24 having a threaded bore 25 to be threaded on the projecting stud 15 or 20. The nut has a diameter sufficient to project radially beyond the unit to form a shoulder 26 for engaging the opposite face of the plate and to lock the unit in position thereon. The nut is provided with a bore portion 27 of out-of-round cross section and preferably similar to that of the cross section of the recesses 16, 21 in the studs. After the nut is threaded into proper position, the bore is aligned with the recess in the stud and a key member 28 having a cross section to cooperate with the bore and recess is inserted into the bore and recess to lock the unit and nut against relative rotary movement.

Means are provided for preventing unintentional removal of the key. While this may take many forms, it is herein illustrated as comprising a threaded socket 29 formed in the nut adjacent the end of the pin and having a set screw 30 threaded therein to engage the end of the key pin and prevent it from being accidentally removed.

Although the pin and socket may be held together by friction cams or other locking means, it is herein illustrated as being provided with a threaded connection; more specifically the pin is threaded at 31 at its base and the socket threaded at 32 adjacent the mouth. The threads extend for a distance to permit some adjustment between the units 12 and 17. Since the rearwardly facing shoulders 14 and 19, as will be noted in Fig. 1, accurately determine the spacing between the plates, the threaded connection permits accurate adjustment of the spacing of these plates.

The preferred method of securing the plates together comprises inserting a male unit 12 in its aperture 22 with the rearwardly facing shoulder 14 engaging the face of the plate, applying the nut 24 to the stud and threading it along the stud until the stud engages the back of the plate. The out-of-round bore in the nut is aligned with the recess in the stud by inserting an out-of-round rod (not shown) into the bore in the nut and the nut turned until the recess and bore are aligned. The rod is removed and the pin 28 is inserted to lock the nut and unit against relative rotation. Thereafter, the set screw 30 is put in place. As shown in Fig. 4, the end of the nut is knurled at 33 to permit turning of the locked unit and nut in the aperture. In a similar manner the female unit is secured to its plate and the nut is locked in position. Thereafter, the plates are brought together and the pin 13 is inserted in the socket 18. The units are then relatively rotated with respect to one another and to the plates so as to cause the threaded connection therebetween to move the plates together. By this means the plates are connected and, if desired, spacing between the plates can be very accurately adjusted within the limits of the threaded portion of the pin and socket.

As an alternate method of securing the plates together, the two units 12 and 17 can have their pin and socket portions connected together after which the units are inserted into the aligned apertures 22 in the plates. The nuts are then threaded on the studs into locking relation and the key pins are inserted. In some instances it may be desired to prevent relative rotation between the plates. While this may be achieved by making the portion of the unit passing through the aperture of out-of-round cross section to prevent rotation in the aperture, it is at present preferred to make the said portion cylindrical and to depend on the clamping action of the nut to prevent relative rotation between the unit and plate.

While the present invention is particularly intended for connecting plates together in spaced relation, it may also be used to form an electrical connection to the plate, or if the plate is insulated therefrom, to some other source. This may be accomplished in many ways but it is preferred, according to the present invention, to form the connector of conducting material and to have a contact lug 34 having an eye 35 and a portion 36 for connection to a conductor 37. The lug is positioned with its eye surrounding the projecting stud portion and the nut is drawn up tight on the eye to form a good electrical connection therewith.

From the foregoing it will be seen that the device is of a simple construction and consists merely of the male and female units, a nut, key pin and set screw. The units and nut can be readily formed on screw machines and the key pin can be cut from continuous stock; while the set screws are standard set screws which can be readily acquired, thus providing a low cost in its manufacture.

Furthermore, it is evident that the device is versatile in the manner in which it can be used to connect the plates mechanically and/or electrically as desired.

Variations and modifications may be made within the scope of the claims and portions of the improvements may be used without others.

I claim:

1. Means for connecting together two plates comprising a pair of units each having cooperating means at one end for interlocking said units together, a shoulder and an adjacent cylindrical portion intermediate the ends of each unit, said cylindrical portion being disposed between the shoulder and a threaded portion having a longitudinally extending recess of out-of-round cross section at the other end, said units being adapted to have the cylindrical portions thereof positioned in apertures formed in said plates with the shoulders on each engaging opposing faces on said plates; and members threaded to the threaded portions of said units and forming shoulders to engage the plates and hold the units in said apertures, said members each having a key means keyed thereto and extending into the respective recess of out-of-round cross section to lock said members and units in assembled relation and against relative rotation.

2. Means for connecting together two members comprising a first unit having a shoulder intermediate the ends of the unit and a threaded stud projecting from the rear of said unit and having a longitudinally extending recess of out-of-round cross section therein; a second unit having a shoulder intermediate the ends of said unit and a threaded stud projecting from the rear of the unit and having a longitudinally extending recess of out-of-round cross section therein, said units having interconnecting means at one end and being adapted to be positioned in apertures formed in said members with the shoulders on each engaging opposing faces on said members; nuts threaded on the projecting studs of each of said units and forming shoulders to engage the members and hold the units in said apertures, said nuts each having key means carried thereby and extending into the recess in the respective projecting stud to lock said nuts and units in assembled relation and against relative rotation; and means for preventing inadvertent removal of said key means.

3. Means for connecting together two members comprising a male unit having a projecting pin at one end, a shoulder intermediate the ends of the unit and a threaded stud projecting from the other end of said unit and having an axial recess of polygonal cross section therein; a female unit having a socket at one end to receive said pin, a shoulder intermediate the end of said unit and a threaded stud projecting from the other end of the unit and having an axial recess of polygonal cross section therein, said pin and socket having cooperating threaded portions for securing said units together and said units being adapted to be positioned in apertures formed in said members with the shoulders on each engaging opposing faces on said members; nuts threaded on the projecting studs of each of said units and forming shoulders to engage the members and hold the units in said apertures, said nuts having a portion of the bore therein of polygonal cross section corresponding to the cross section of the recess in said stud; key means extending into each bore and recess of polygonal cross section to lock said nuts and units in assembled relation and against relative rotation; and means for preventing inadvertent removal of said key means.

4. Means for connecting together two members comprising a male unit having a projecting pin at one end, a shoulder intermediate the ends of the unit and a threaded stud projecting from the other end of said unit, said stud having a recess of polygonal cross section therein and opening in the end thereof; a female unit having a socket at one end to receive said pin, a shoulder intermediate the ends of said unit and a threaded stud projecting from the other end of the unit and having a recess of polygonal cross section therein and opening in the end thereof, said pin and socket having cooperating threaded portions, each of said units having a cylindrical portion disposed between the respective shoulder and threaded stud and adapted to be rotatably positioned in apertures formed in said members with the shoulders on each engaging opposing faces on said members; and nuts threaded on the projecting studs of said units and forming shoulders to engage the members and hold the units in said apertures, said nuts having key means thereon extending into the respective recess of polygonal cross section to lock the respective nut and unit in assembled relation and against relative rotation, said units being relatively rotated on the members to cause the threaded portions on the pin and socket to connect and properly locate the members in spaced relation.

5. Means for connecting together two members comprising a male unit having a projecting pin at one end, a shoulder intermediate the ends of the unit and a threaded stud projecting from the other end of said unit and having an axial recess of polygonal cross section therein; a female unit having a socket at one end to receive said pin, a shoulder intermediate the end of said unit and a threaded stud projecting from the other end of the unit and having an axial recess of polygonal cross section therein, said pin and socket having cooperating threaded portions for securing said units together and said units being adapted to be positioned in apertures formed in said members with the shoulders on each engaging opposing faces on said members; nuts threaded on the projecting studs of said units and forming shoulders to engage the members and hold the units in said apertures, said nuts having a portion of the bore therein of polygonal cross section corresponding to the cross section of the recess in the respective stud; a key pin extending into each bore and recess of polygonal cross section to lock each said nut and unit in assembled relation and against relative rotation; and a set screw on each nut engaging the key pin for preventnig inadvertent removal of said key pin from locking position.

6. An electrical connector comprising a male unit having a projecting pin at one end, a shoulder and a cylindrical portion intermediate the ends of the unit, said cylindrical portion being disposed between said shoulder and a threaded portion having an axial recess of polygonal cross section at the other end; a female unit having a socket at one end to interlockingly receive said pin, a shoulder and a cylindrical portion intermediate the ends of said unit, said cylindrical portion being disposed between said shoulder and a threaded portion having an axial recess of polygonal cross section at the other end, said units being adapted to have the cylindrical portions thereof positioned in apertures formed in supporting means therefor with the shoulders on each engaging opposing faces of said supporting means; members threaded to the threaded portions of said units and forming shoulders to engage the supporting means and hold the units in said apertures, said members each having a key means keyed thereto and extending into the recesses of polygonal cross section to lock said members and units in assembled relation and against relative rotation; and means secured to said connector adapted to electrically connect a conductor thereto.

7. Means for connecting together two members and forming an electrical connection thereto comprising a male unit having a projecting pin at one end, a shoulder intermediate the ends of the unit and a threaded stud projecting from the other end of said unit and having an axial recess of polygonal cross section therein; a female unit having a socket at one end to receive said pin, a shoulder intermediate the ends of said unit and a threaded stud projecting from the other end of the unit and having an axial recess of polygonal cross section therein, said pin and socket having cooperating threaded portions, said units each having cylindrical portions disposed between said shoulder and threaded stud, said cylindrical portions being adapted to be rotatably positioned in apertures formed in said members with the shoulders on each engaging opposing faces on said members; a connector lug having an eye to be disposed over the stud and having a portion adapted to be connected to an electrical conductor; and nuts threaded on the projecting studs of said units and forming shoulders to engage the members and hold the units in said apertures and to clamp the connector lug to the unit, said nuts each having key means thereon extending into the respective recess of polygonal cross section to lock said nuts and units in assembled relation and against relative rotation, said units being relatively rotated on the members to cause the threaded portions on the pin and socket to connect and properly locate the members in spaced relation.

8. Means for connecting together two plates comprising a male unit having a projecting pin at one end, a shoulder and an adjacent cylindrical portion intermediate the ends of the unit, said cylindrical portion being disposed between the shoulder and one end of a threaded portion, said threaded portion having an axial recess of polygonal cross section at the other end; a female unit having a socket at one end to cooperate with and receive said pin, a shoulder and an adjacent cylindrical portion intermediate the ends of said unit, said cylindrical portion being disposed between the shoulder and one end of a threaded portion, said threaded portion having an axial recess of polygonal cross section at the other end, said units being adapted to have the cylindrical portions thereof positioned in apertures formed in said plates with the shoulders on each engaging opposing faces on said plates; and members threaded to the threaded portions of said units and forming shoulders to engage the back of the plates and hold the units in said apertures, said members each having a key means keyed thereto and extending into the respective recess of polygonal cross section to lock said members and units in assembled relation and against relative rotation.

References Cited in the file of this patent
UNITED STATES PATENTS

| | | |
|---|---|---|
| 1,098,646 | Stager | June 2, 1914 |
| 2,885,602 | Emerson et al. | May 5, 1959 |
| 2,904,771 | Burtt et al. | Sept. 15, 1959 |